United States Patent
M et al.

(10) Patent No.: US 12,469,480 B2
(45) Date of Patent: Nov. 11, 2025

(54) FILTERING NOISE IN AN EVENT DEVICE SYSTEM

(71) Applicant: Honeywell International Inc., Charlotte, NC (US)

(72) Inventors: Shreelatha M, Bengaluru (IN); Vimal Gracian, Trivandrum (IN)

(73) Assignee: Honeywell International Inc., Charlotte, NC (US)

( * ) Notice: Subject to any disclaimer, the term of this patent is extended or adjusted under 35 U.S.C. 154(b) by 497 days.

(21) Appl. No.: 17/957,028

(22) Filed: Sep. 30, 2022

(65) Prior Publication Data

US 2024/0112666 A1    Apr. 4, 2024

(51) Int. Cl.
*G10K 11/178* (2006.01)

(52) U.S. Cl.
CPC .. G10K 11/17853 (2018.01); G10K 11/17879 (2018.01)

(58) Field of Classification Search
CPC ........ G10K 11/17853; G10K 11/17879; G08B 25/10; G08B 25/007; H04B 1/0475; H04B 1/10; H04B 1/40
See application file for complete search history.

(56) References Cited

U.S. PATENT DOCUMENTS

| 8,666,319 | B2 | 3/2014 | Kloper et al. | |
| 2013/0017794 | A1* | 1/2013 | Kloper | H04W 74/0808 455/63.1 |
| 2021/0144650 | A1* | 5/2021 | Abdelmonem | H04L 5/0073 |

FOREIGN PATENT DOCUMENTS

| KR | 102028315 B1 | 10/2019 | |
| WO | WO-2021136428 A1 * | 7/2021 | .......... H04B 17/336 |

OTHER PUBLICATIONS

Li, P., Yang, p. and Yan, Y., 2020. Periodicity makes perfect: recovering interfered preamble for high-coexistence wireless systems. EURASIP Journal on Wireless Communications and Networking, 2020(1), p. 45.*
Zhang, X. and Shin, K.G., 2012. Cooperative carrier signaling: Harmonizing coexisting WPAN and WLAN devices. IEEE/ACM Transactions on Networking, 21(2), pp. 426-439.*
Li et. al, "Periodicity Makes Perfect: Recovering Interfered Preamble for High-Coexistence Wireless Systems", Eurasip Journal on Wireless Communications and Networking, Feb. 19, 2020, pp. 19, vol. 2020, issue 1.
Baccour, et al.; Springer Link: "External Radio Interference"; First Online: Jul. 19, 2013 (111 pgs).

* cited by examiner

*Primary Examiner* — Zhitong Chen
(74) *Attorney, Agent, or Firm* — Brooks, Cameron & Huebsch, PLLC (57) ABSTRACT

Devices, systems, and methods for filtering noise in an event device system are described herein. In some examples, one or more embodiments include an event device comprising a transceiver having an antenna, a memory and a processor to execute instructions stored in the memory to cause the transceiver to perform a long scan for noise via the antenna at a predetermined sampling duration, determine whether a noise level of the noise exceeds a threshold noise value, determine whether the noise is detected in at least one of a first channel and a second channel of the event device, determine a noise filter threshold for at least the first channel and the second channel based on whether the noise is detected in the first channel and the second channel, and apply the noise filter threshold to filter future noise.

18 Claims, 4 Drawing Sheets

FILTERING NOISE IN AN EVENT DEVICE SYSTEM

TECHNICAL FIELD

The present disclosure relates to devices, systems, and methods for filtering noise in an event device system.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system may include a control panel and a number of event devices (e.g., sensors, flashers, sounders, pull stations, etc.) located throughout the facility (e.g., on different floors and/or in different rooms of the facility) that can perform an action when an emergency event is occurring in the facility and provide a notification of the emergency event to the occupants of the facility via visible means, audible means, or other mechanisms.

DETAILED DESCRIPTION

Devices, systems, and methods for filtering noise in an event device system are described herein. In some examples, one or more embodiments include an event device comprising a transceiver having an antenna, a memory and a processor to execute instructions stored in the memory to cause the transceiver to perform a long scan for noise via the antenna at a predetermined sampling duration, determine whether a noise level of the noise exceeds a threshold noise value, determine whether the noise is detected in at least one of a first channel and a second channel of the event device, determine a noise filter threshold for at least the first channel and the second channel based on whether the noise is detected in the first channel and the second channel, and apply the noise filter threshold to filter future noise.

A facility can utilize an event device system in order to warn occupants of the facility of an emergency event, such as a fire. As used herein, the term "event device system" refers to a system of devices that can detect an emergency event and communicate information about the emergency event in order to provide an audible and/or visible warning during the emergency event. For example, the event device system can utilize event device devices to warn occupants of the emergency event occurring in the space (e.g., such as a fire). As used herein, the term "event device" refers to a device that can receive an input relating to an event and/or generate an output relating to an event. Such event device devices can be a part of the event device system of a space in a facility/in the facility at large and can include devices such as fire sensors, smoke detectors, heat detectors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of event device devices.

Certain event device systems can include event devices that communicate wirelessly. For example, certain event devices can communicate with other event devices and/or an event device system control panel via a wireless mesh network. Such event device systems can provide secure and reliable communication where traditional wired event devices may be costly, obtrusive, and/or dangerous to use.

While these event devices that communicate wirelessly may be installed and operating in a facility, they may not be the only devices in the facility. In some instances, other devices in the facility may cause interference with the wireless event devices as a result of the other devices operating in a same frequency band as the wireless event devices. For example, security systems, energy meters, and/or wireless radio communication devices may generate electronic noise that can interfere with the wireless communication capabilities of the event devices in the facility.

While frequency spread spectrum, frequency-shift keying (FSK) modulation, spread spectrum with frequency hopping techniques, and/or redundant frequency techniques can be utilized for wireless communication of event devices, such techniques may not be sufficient to eliminate noise experienced by the event devices in the event device system. As a result, user complaints about the operation of the event device system may arise. Such complaints may result in technician visits, costing time and money. Additionally, if a noise level goes beyond a particular amount, an event device can experience packet drops, which can result in communication link failures. Such link failures may result in an unreliable event device system.

Noise filter application for noise in an event device system, according to the present disclosure, can allow for identification of a nature of detected noise. Based on the nature of the detected noise, a unique dynamically varying noise filter can be utilized on each event device in the event device system to filter noise experienced by an event device. Such an approach can provide better immunity in a noisy environment in a facility for each individual event device, resulting in a more reliable event device system and less technician visits to the facility, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
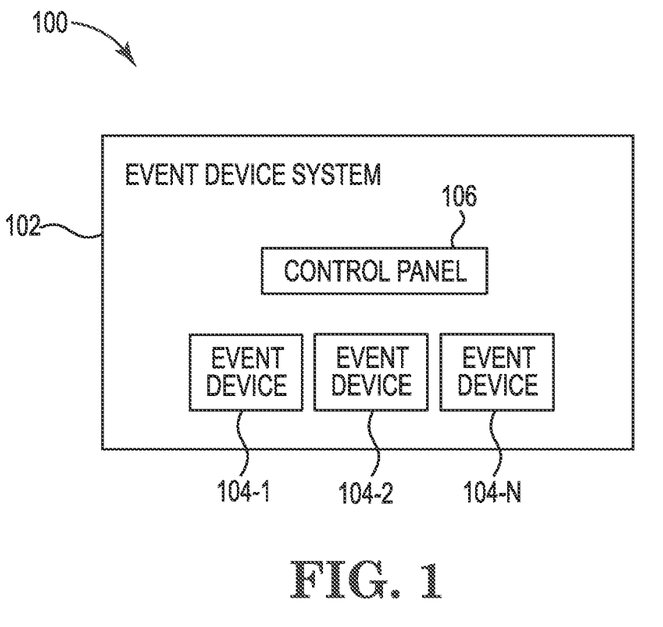
FIG. 1 is an example of a system for filtering noise in an event device system, in accordance with one or more embodiments of the present disclosure.

FIG. 1 is an example of a system 100 for filtering noise in an event device system 102, in accordance with one or more embodiments of the present disclosure. The system 100 can include an event device system 102, event devices 104-1, 104-2, 104-N, and a control panel 106.

As mentioned above, the system 100 can be included in a facility, a space in a facility, etc. The system 100 can include an event device system 102. The event device system 102 can include a device/series of devices (e.g., event devices 104-1, 104-2, 104-N) in order to detect events and/or process and/or analyze the detected events to determine whether to generate an alarm for occupants of the facility.

The event device system 102 can include event devices 104-1, 104-2, 104-N. The event devices 104-1, 104-2, 104-N can be devices to detect an event and transmit the detected event for processing and/or analysis. As mentioned above, the event devices 104-1, 104-2, 104-N can include, for example, cameras, motion sensors, fire sensors, smoke detectors, heat detectors, carbon monoxide (CO) detectors, or combinations of these; interfaces; manual call points (MCPs), pull stations; input/output modules; aspirating units; sprinkler controls; and/or audio/visual devices (e.g., speakers, microphones, cameras, video displays, video screens, etc.), relay output modules, among other types of event devices.

The event device system 102 can further include a control panel 106. The control panel 106 can be utilized to control the various event devices 104-1, 104-2, 104-N included in the event device system 102.

As mentioned above, the event devices 104-1, 104-2, 104-N can be connected to each other in order for communication via wireless mesh network. For example, the event devices 104-1, 104-2, 104-N can be organized in a mesh topology (e.g., a system of interconnected nodes) for communication in order to filter noise in an event device system, as is further described herein.

While the event devices 104-1, 104-2, 104-N are described above as being connected via a wireless mesh network, embodiments of the present disclosure are not so limited. For example, the event devices 104-1, 104-2, 104-N can be connected via any other wireless network relationship. Examples of such network relationships can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

During operation of the event devices 104-1, 104-2, 104-N in the facility, the event devices 104-1, 104-2, 104-N may encounter noise as a result of other devices operating in the facility. Noise can be, for example, an unwanted disturbance or interference with an electrical signal. For example, the event devices 104-1, 104-2, 104-N may receive an unwanted electrical signal on various electrical circuits of the event devices 104-1, 104-2, 104-N, which can disrupt information carrying signals (e.g., signals carrying packets of information) intended for the event devices 104-1, 104-2, 104-N. Such electrical noise may be generated by security systems, radios (e.g., walkie-talkies), and/or energy meters, among other types of devices operating in the facility that may generate noise that can disrupt operation of the event devices 104-1, 104-2, 104-N. Accordingly, the event devices 104-1, 104-2, 104-N can perform various steps to filter such noise, as is further described herein.

In order to determine a noise filter threshold to filter noise, an event device (e.g., event device 104-1) can include a transceiver and an antenna, and can cause the transceiver to perform a short scan via the antenna for noise at a first sampling duration (e.g., a different sampling duration that is less than the predetermined sampling duration). The short scan can be a scan for electronic noise that may be experienced by the event device 104-1. For example, the event device 104-1 can cause the transceiver to perform a short scan by sampling, via the antenna, for noise six times in a three second interval. However, the short scan is not limited to six times in a three second interval. For example, the short scan can be performed at other sampling durations, such as more or less than six times in a particular interval that is longer or shorter than three seconds.

Although the event device 104-1 is described herein as performing the various steps to filter noise, embodiments of the present disclosure are not so limited. For example, each of the event devices 104-1, 104-2, 104-N may perform the various steps described herein to filter noise.

A short scan can be performed by the transceiver of the event device 104-1 in response to the event device 104-1 entering a receive mode. The event devices 104-1, 104-2, 104-N can operate off of duty cycles in which the event devices 104-1, 104-2, 104-N operate in various modes including at least a transmit mode and/or a receive mode. When the event devices 104-1, 104-2, 104-N are operating in a receive mode to receive packets, transceivers of the event devices 104-1, 104-2, 104-N can perform the short scan at the first sampling duration. The first sampling duration of the short scan can be less (e.g., shorter) than the long sampling duration, as is further described herein.

During the short scan, the event device 104-1 may detect some level of noise. The level of noise can be quantified according to a Received Signal Strength Indicator (RSSI) value. For example, the event device 104-1 may detect noise at −70 decibel-milliwatts (dBm).

The event device 104-1 can determine whether the noise detected during the short scan includes a packet preamble. During the short scan, the noise detected by the event device 104-1 may not actually be noise, but rather a packet (e.g., an Ethernet frame) including information intended for the event device 104-1. The packet preamble can include a section of data at the head of a packet (e.g., a header). Such a packet preamble can indicate to the event device 104-1 that the packet is intended for the event device 104-1 and is not noise. Accordingly, in response to the noise detected by the short scan including the packet preamble, the event device 104-1 can consider the noise as a packet for reception and analysis, rather than noise.

In response to the noise detected by the short scan not including a packet preamble and the noise not exceeding a threshold noise value, the event device 104-1 can log the noise level for diagnostics. For example, a noise level detected at −70 dBm may be considered to be a false detection and the event device 104-1 can log the detected noise amount for future diagnostic purposes.

However, in response to the noise detected by the short scan not including the packet preamble, as well as the noise exceeding a threshold noise value in more than a threshold amount of samples, the event device 104-1 can cause the transceiver to perform a long scan via the antenna. The event device 104-1 can determine, based on the noise detected by the long scan, whether a noise level of the noise exceeds a threshold noise value. In response to the noise level (e.g., −75 dBm) exceeding a threshold noise value (e.g., −85 dBm) in at least four samples (e.g., which is more than a threshold amount of samples of three), the event device 104-1 can cause the transceiver to perform a long scan via the antenna for noise at a second sampling duration. As mentioned above, the first sampling duration can be less (e.g., shorter) than the second sampling duration. For example, the event device 104-1 can cause the transceiver to perform the long scan by sampling for noise six times in a ten second interval (e.g., the second sampling duration) via the antenna.

The short scan described above can be utilized by the event device 104-1 to determine whether there is noise present that may affect the event device 104-1. The long scan described above can be performed across an entire frequency band of the event device 104-1 which can be utilized to model the type of noise detected, as is further described herein.

As mentioned above, the event device 104-1 can cause the transceiver to perform the long scan at the second predetermined sampling duration to determine whether the noise level exceeds the threshold noise value in more than a threshold amount of samples. In response to the noise level not exceeding the threshold noise value in more than the threshold amount of samples (e.g., the noise level did not exceed the threshold noise value in more than five samples), the event device 104-1 can ignore the noise detected by the long scan. For example, the noise detected may not be sufficient enough to interfere with wireless communication of the event device 104-1.

However, in an example in which the noise level does exceed the threshold noise value in more than the threshold amount of samples, the event device 104-1 can scan all communication channels associated with the event device 104-1. Such a scan can occur when the event device 104-1 is not doing any transmission for a particular duration (e.g., 500 milliseconds (ms)). Additionally, the event device 104-1 can calculate an average (e.g., a weighted average) of the RSSI of each channel associated with the event device 104-1.

In addition, in response to the noise level exceeding the threshold value in more than a threshold amount of samples, the event device 104-1 can determine whether the noise is detected in more than one channel. For example, the event device 104-1 can include a first channel and a second channel. The event device 104-1 can determine whether the noise was detected in the first channel and/or the second channel.

If the event device 104-1 detects noise just in the first channel, the event device 104-1 can consider the noise type as narrow band noise and determine the noise filter threshold for the first channel. For example, the −75 dBm noise level detected by the event device 104-1 may be detected in the first channel. The event device 104-1 can determine the noise filter threshold for the first channel to be −75 dBm. In such an instance, the event device 104-1 can consider the noise to be narrow band noise (e.g., since it was just detected on the first channel), and accordingly, can determine the noise filter threshold for the first channel.

While the event device 104-1 is described above as determining the noise filter threshold for the first channel, embodiments of the present disclosure are not so limited. For example, the event device 104-1 may detect noise just in the second channel, and can accordingly determine the noise filter threshold for just the second channel.

Additionally, while the event device 104-1 is described above as including a first channel and a second channel, embodiments of the present disclosure are not so limited. For example, the event device 104-1 may include more than two channels or less than two channels.

If the event device 104-1 detects noise in the first channel and the second channel, the event device 104-1 can consider the noise type as broadband noise and determine the noise filter threshold for the first channel and the second channel. For example, the −75 dBm noise level detected by the event device 104-1 may be detected in the first channel and the second channel. The event device 104-1 can determine the noise filter threshold for the first channel to be −75 dBm and the second channel to be −75 dBm. In such an instance, the event device 104-1 can consider the noise to be broadband noise (e.g., since it was detected on more than one channel), and accordingly, can determine the noise filter threshold for the first channel and the second channel.

In either instance described above (e.g., whether the event device 104-1 considers the noise type as broadband or narrowband), the event device 104-1 can further determine whether the noise was observed continuously through sampling. For example, if the event device 104-1 determines the broadband noise observed was not continuous through sampling, the event device 104-1 can further consider the broadband noise as discrete and determine the duty cycle of the discrete broadband noise. Additionally, if the event device 104-1 determines the broadband noise observed was continuous through sampling, the event device 104-1 can further consider the broadband noise as continuous broadband noise. Further, if the event device 104-1 determines the narrowband noise observed was not continuous through sampling, the event device 104-1 can further consider the narrowband noise as discrete and determine the duty cycle of the discrete narrowband noise. Moreover, if the event device 104-1 determines the narrowband noise observed was continuous through sampling, the event device 104-1 can further consider the narrowband noise as continuous narrowband noise. If the duty cycle of discrete noise (e.g., broadband or narrowband) is negligible (e.g., less than a threshold period) and therefore not an issue for communication of the event devices 104-1, 104-2, 104-N over the wireless mesh network, the event device 104-1 can refrain from considering the discrete noise when determining the noise filter threshold.

Accordingly, the event device 104-1 can determine the noise filter threshold for any channels on which noise is detected. The event device 104-1 can apply the noise filter threshold to filter future noise.

Accordingly, filtering noise in an event device system can allow for identification of the nature of various types of noise experienced by event devices in an event device system in order to dynamically vary a noise filter for each channel of each link of each event device. Such an approach can provide for better noise immunity to prevent packet drops and/or link failures in the event device system, as compared with previous approaches.

As described above, the event device 104-1 can utilize a threshold noise value. The event device 104-1 can further determine the threshold noise value for use above, as is further described herein.

When the event device 104-1 causes the transceiver to perform the short scan and detects noise, and a predetermined packet that the event device 104-1 expects to receive is not received, the event device 104-1 can determine the threshold noise value. For example, as mentioned above, the event device 104-1 can determine whether the noise detected includes a packet preamble. If the noise does not include an associated packet preamble, the event device 104-1 can determine that no packet was received and that the energy detected by the antenna is noise. In response to a packet not being received by the event device 104-1, the event device 104-1 can cause the transceiver to perform the short scan and subsequent steps as described above to determine a noise filter threshold. In an example in which a packet was received, the event device 104-1 can determine whether the packet was a result of the event device 104-1's own operation. If so, the event device 104-1 can determine an average of the RSSI of its own links. If not, the event device 104-1 can use a default noise filter threshold (e.g., −85 dBm).

Additionally, the event device 104-1 can determine whether noise detected in any of the channels (e.g., the first channel or the second channel) is not impacting communication with another event device (e.g., event device 104-2 or event device 104-N). If the noise observed in any of the channels is impacting communication, the event device 104-1 can continue to utilize the default threshold noise value (e.g., −85 dBm).

The event device 104-1 can determine whether the noise value is greater than an RSSI value of a link of the event device. For example, noise value can be determined to be −75 dBm and the RSSI value of the link of the event device 104-1 can be −80 dBm. In response, the event device 104-1 can neglect the noise and set or maintain the threshold noise value as the RSSI value of the link plus an additional predetermined amount (e.g., 8 dBm, a buffer amount) for the next packet reception.

In some examples, the noise value can be determined to be −80 dBm and the RSSI value of the link of the event device 104-1 can be −70 dBm. In response to the noise value being less than the RSSI value of the link, the event device 104-1 can set the threshold noise value as the average RSSI value of the link plus an additional predetermined amount (e.g., 8 dBm, a buffer amount) for the next packet reception.

Accordingly, as indicated above, if the noise level is higher than the RSSI value of the link itself (e.g., it's own channel/link RSSI value), the event device 104-1 can neglect the noise. If the noise level is higher than the default threshold RSSI value (e.g., −85 dBm) but less than the RSSI value of the link itself (e.g., its own channel/link RSSI value), the event device 104-1 can determine a threshold noise value (e.g., a dynamic threshold noise value) for every packet reception for every channel on which noise is detected (e.g., as is described above).

Figure 2:
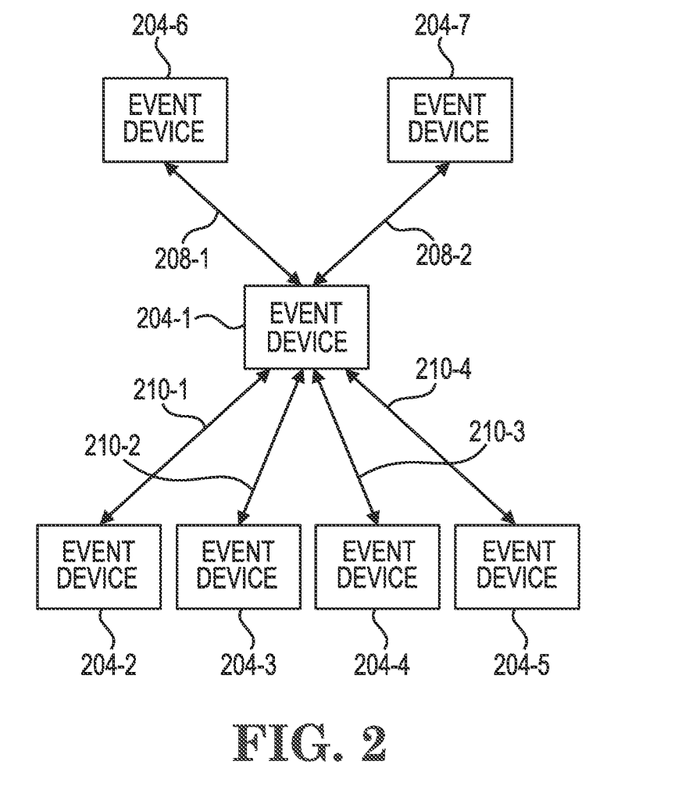
FIG. 2 is an example of various event devices in communication in an event device system, in accordance with one or more embodiments of the present disclosure.

FIG. 2 is an example of various event devices 204 in communication in an event device system, in accordance with one or more embodiments of the present disclosure. As illustrated in FIG. 2, event devices 204-1, 204-2, 204-3, 204-4, 204-5, 204-6, and 204-7 can be in communication with each other via an uplinks 208-1, 208-2 and downlinks 210-1, 210-2, 210-3, 210-4.

As illustrated in FIG. 2, the event device 204-1 can be in communication with event devices 204-6 via uplink 208-1 and 204-7 via uplink 208-2. For example, the event device 204-1 can be transmitting a signal (e.g., packets) to the event device 204-6 via the uplink 208-1 and/or a signal to the event device 204-7 via the uplink 208-2.

Additionally, the event device 204-1 can be in communication with event device 204-2 via downlink 210-1, event device 204-3 via downlink 210-2, event device 204-4 via downlink 210-3, and/or event device 204-5 via downlink 210-4. For example, the event device 204-1 can be receiving a signal (e.g., packets) from the event device 204-2 via downlink 210-1, from the event device 204-3 via downlink 210-2, from the event device 204-4 via downlink 210-3, and from the event device 204-5 via downlink 210-4.

As previously described in connection with FIG. 1, the event device 204-1 can cause a transceiver of the event device 204-1 to perform a short scan to detect noise via an antenna of the event device 204-1. The event device 204-1 can determine whether noise detected in the short scan is detected in any channels associated with the uplinks 208-1 and/or 208-2 of the event device 204-1. For example, the event device can determine whether noise is detected in the short scan is in a first channel, a second channel, a third channel, etc. associated with any of the uplinks 208-1, 208-2.

Additionally, the event device 204-1 can determine whether noise detected in the short scan is detected in any channels associated with the downlink 210-1 of the event device 204-1, the downlink 210-2 of the event device 204-1, the downlink 210-3 of the event device 204-1, and/or the downlink 210-4 of the event device 204-1. For example, the event device can determine whether noise is detected in the short scan in a first channel, a second channel, a third channel, etc. associated with the downlink 210-1, whether noise is detected in the short scan in a first channel, a second channel, a third channel, etc. associated with the downlink 210-2, whether noise is detected in the short scan in a first channel, a second channel, a third channel, etc. associated with the downlink 210-3, and whether noise is detected in the short scan in a first channel, a second channel, a third channel, etc. associated with the downlink 210-4.

Figure 3:
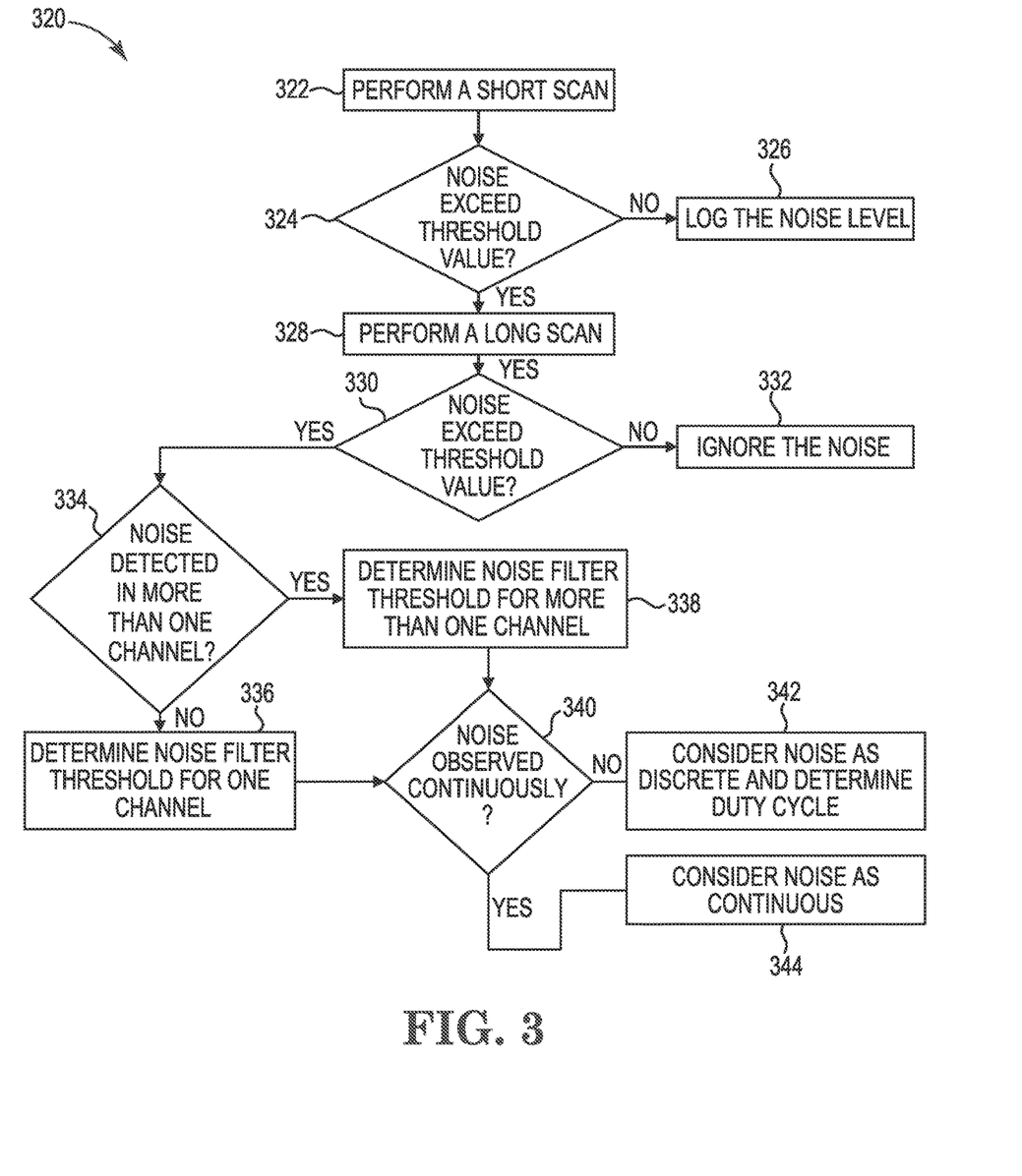
FIG. 3 is an example of a flowchart of a method for filtering noise in an event device system, in accordance with one or more embodiments of the present disclosure.

FIG. 3 is an example of a flowchart of a method for filtering noise in an event device system, in accordance with one or more embodiments of the present disclosure. The method 320 can be performed by each event device of an event device system (e.g., event devices 104-1, 104-2, 104-N, respectively, previously described in connection with FIG. 1).

At 322, the event device can cause a transceiver of the event device to perform a short scan for noise via an antenna of the event device. The short scan can be performed at a first sampling duration. For example, the antenna and the transceiver of the event device can sample for noise six times in a three second interval.

At 324, the event device can determine whether any noise detected from the short scan exceeds a threshold noise value. For example, the threshold noise value may be −85 dBm. In response to the noise level not exceeding the threshold noise value, at 326 the event device can log the noise level for use for diagnostic purposes.

In response to a noise level exceeding the threshold noise value, at 328, the event device can cause the transceiver to perform a long scan via the antenna. The long scan can be performed at a second sampling duration that is greater (e.g., more frequent) than the short sampling duration. For example, the event device can sample for noise six times in a ten second interval.

At 330, the event device can determine whether any noise detected from the long scan exceeds a threshold noise value in less than a threshold amount of samples. For example, the threshold noise value may be −88 dBm. In response to the noise level not exceeding the threshold noise value in more than a threshold amount of samples, at 332 the event device can ignore the noise.

In response to four samples of noise exceeding the threshold noise value where the threshold amount of samples is five (e.g., six samples of noise exceeding −88 dBm were detected by the event device), at 334, the event device can determine whether the noise was detected in more than one channel of the event device. If the noise was not detected in more than one channel, the event device can consider the noise as narrowband noise and, at 336, determine a noise filter threshold for the channel in which noise was detected. If the noise was detected in more than one channel, the event device can determine the noise as broadband noise and, at 338, determine a noise filter threshold for each channel in which noise was detected. In the example in which the noise is considered as broadband noise, each noise filter threshold for each channel or link can, in some examples, be different.

At 340, the event device can determine whether the noise was observed continuously. If the noise was broadband noise and was not observed continuously, the event device can determine, at 342, that the broadband noise is discrete noise and determine a duty cycle of the discrete broadband noise. If the noise was broadband noise and was observed continuously, the event device can determine, at 344, that the broadband noise is continuous broadband noise. Similarly, if the noise was narrowband noise and was not observed continuously, the event device can determine, at 342, that the narrowband noise is discrete noise and determine a duty cycle of the discrete narrowband noise. Finally, if the noise was narrowband noise and was observed continuously, the event device can determine, at 344, that the narrowband noise is continuous narrowband noise.

Figure 4:
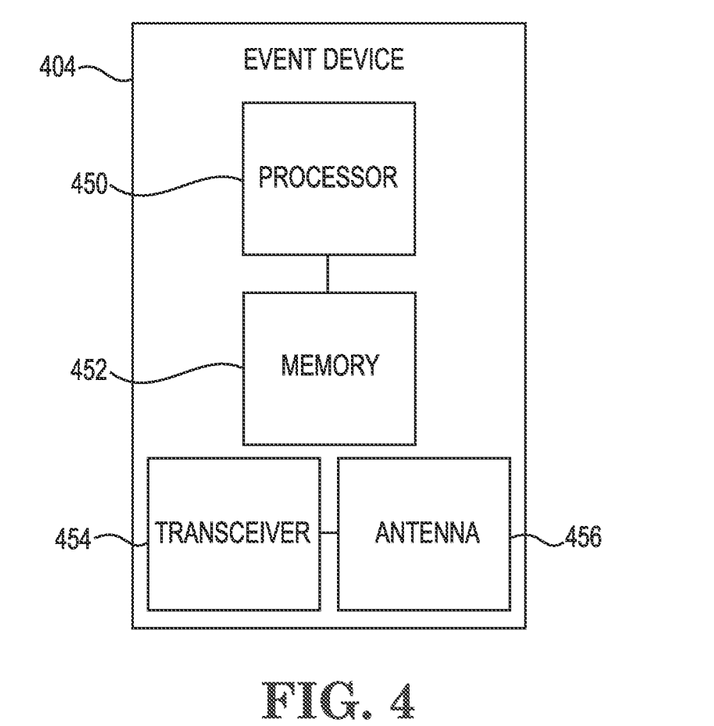
FIG. 4 is an example of an event device for filtering noise in an event device system, in accordance with one or more embodiments of the present disclosure.

FIG. 4 is an example of an event device 404 for filtering noise in an event device system, in accordance with one or more embodiments of the present disclosure. As illustrated in FIG. 4, the event device 404 can include a memory 452, a processor 450, a transceiver 454, and an antenna 456 for filtering noise in an event device system, in accordance with the present disclosure.

The memory 452 can be any type of storage medium that can be accessed by the processor 450 to perform various examples of the present disclosure. For example, the memory 452 can be a non-transitory computer readable medium having computer readable instructions (e.g., executable instructions/computer program instructions) stored thereon that are executable by the processor 450 for filtering noise in an event device system in accordance with the present disclosure.

The memory 452 can be volatile or nonvolatile memory. The memory 452 can also be non-removable (e.g., internal) memory. For example, the memory 452 can be random access memory (RAM) (e.g., dynamic random access memory (DRAM) and/or phase change random access memory (PCRAM)), and/or read-only memory (ROM) (e.g., electrically erasable programmable read-only memory (EEPROM), among other types of memory.

Further, although memory 452 is illustrated as being located within event device 404, embodiments of the present disclosure are not so limited. For example, memory 452 can also be located internal to another computing resource (e.g., enabling computer readable instructions to be downloaded over the Internet or another wired or wireless connection).

The processor 450 may be a central processing unit (CPU), a semiconductor-based microprocessor, and/or other hardware devices suitable for retrieval and execution of machine-readable instructions stored in the memory 452.

The event device 404 can include the transceiver 454 and the antenna 456. The computing device 404 can cause the transceiver 454 to perform a short scan via the antenna 456 for noise at a first sampling duration for filtering noise in an event device system. If any noise detected by the short scan exceeds a threshold noise value, the computing device 404 can cause the transceiver 454 to perform a long scan via the antenna 456 for filtering noise in an event device system, as described above.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An event device for filtering noise in an event device system, comprising:
 a transceiver having an antenna;
 a memory; and
 a processor configured to execute executable instructions stored in the memory to:
  cause a transceiver to perform a short scan for noise via an antenna at a first sampling duration;
  in response to the noise being detected by the short scan and a predetermined packet not being received during the short scan, determine a threshold noise value;
  in response to the noise detected by the short scan exceeding the threshold noise value in more than a threshold amount of samples, cause the transceiver to perform a long scan for noise via the antenna at a second sampling duration;

determine, based on the noise detected by the long scan, whether a noise level of the noise detected by the long scan exceeds the threshold noise value;

in response to the noise level of the noise detected by the long scan exceeding the threshold noise value, determine whether:

the noise detected by the long scan is detected in at least one of a first channel and a second channel of the event device; and noise detected in the first channel or the second channel is used for communication with another device;

determine a noise filter threshold for at least the first channel and the second channel in response to noise being detected in the first channel and the second channel; and apply the noise filter threshold to filter future noise.

2. The event device of claim 1, wherein in response to the noise being detected in the first channel, the processor is configured to execute the instructions to determine the noise filter threshold for the first channel.

3. The event device of claim 1, wherein in response to the noise being detected in the first channel and the second channel, the processor is configured to execute the instructions to determine the noise filter threshold for the first channel and the second channel.

4. The event device of claim 1, wherein the processor is configured to execute the instructions to cause the transceiver to perform a short scan for noise via the antenna at a different sampling duration, wherein the different sampling duration is less than the second sampling duration.

5. The event device of claim 4, wherein in response to the noise detected by the short scan exceeding the threshold noise value, the processor is configured to execute the instructions to cause the transceiver to perform the long scan.

6. The event device of claim 4, wherein in response to the noise detected by the short scan not exceeding the threshold noise value, the processor is configured to execute the instructions to log the noise level for diagnostics.

7. The event device of claim 1, wherein in response to the noise level exceeding the threshold noise value in more than a threshold amount of samples, determine whether the noise is detected in at least one of the first channel and the second channel.

8. The event device of claim 7, wherein in response to the noise level not exceeding the threshold noise value in more than the threshold amount of samples, ignore the noise detected by the long scan.

9. A non-transitory computer readable medium having computer readable instructions stored thereon that are executable by a processor of an event device to:

cause a transceiver to perform a short scan for noise via an antenna at a first sampling duration;

in response to the noise being detected by the short scan and a predetermined packet not being received during the short scan, determine a threshold noise value;

in response to the noise detected by the short scan exceeding the threshold noise value in more than a threshold amount of samples, cause the transceiver to perform a long scan for noise via the antenna at a second sampling duration, wherein the first sampling duration is less than the second sampling duration;

determine, based on the noise detected by the long scan, whether a noise level of the noise exceeds the threshold noise value;

in response to the noise level of the noise detected by the long scan exceeding the threshold noise value, determine whether:

the noise is detected in at least one of a first channel and a second channel of the event device; and noise in the first channel or the second channel is used for communication with another device;

in response to the noise being detected in the first channel, determine a noise filter threshold for the first channel;

in response to the noise being detected in the first channel and the second channel, determine the noise filter threshold for the first channel and a noise filter threshold for the second channel;

determine a noise filter threshold for at least the first channel and the second channel based on whether the noise is detected in the first channel and the second channel; and apply the noise filter threshold to filter future noise.

10. The computer readable medium of claim 9, wherein in response to the noise not being used for communication with another device, utilize a default threshold noise value.

11. The computer readable medium of claim 9, wherein in response to the predetermined packet being received, determine whether the noise value is greater than a received signal strength indicator (RSSI) value of a link of the event device.

12. The computer readable medium of claim 11, wherein:

in response to the noise value being greater than the RSSI value of the link, neglect the noise and set the threshold noise value as the RSSI value of the link plus an additional predetermined amount for a next packet reception; and in response to the noise value being less than the RSSI value of the link and greater than a default threshold noise value, set the threshold noise value as an average RSSI value of the link.

13. The computer readable medium of claim 9, wherein in response to the predetermined packet being received, the computer readable instructions are executable by the processor to utilize a default threshold noise value for the threshold noise value.

14. A method for filtering noise in an event device system, comprising:

causing, by an event device, a transceiver of the event device to perform a short scan for noise via an antenna at a first sampling duration;

determining, by the event device in response to the noise being detected by the short scan and a predetermined packet not being received during the short scan, a threshold noise value;

in response to the noise detected by the short scan exceeding a threshold noise value in more than a threshold amount of samples, causing, by the event device, the transceiver to perform a long scan for noise via the antenna at a second sampling duration, wherein the first sampling duration is less than the second sampling duration;

determining, by the event device based on the noise detected by the long scan, whether a noise level of the noise detected by the long scan exceeds the threshold noise value;

in response to the noise level of the noise detected by the long scan exceeding the threshold noise value, determining, by the event device, whether:

the noise detected by the long scan is detected in at least one of a first channel and a second channel of the event device; and noise detected in the first channel or the second channel is used for communication with another device;

in response to the noise being detected in the first channel, determining, by the event device, the noise filter threshold for the first channel;

in response to the noise being detected in the first channel and the second channel, determining, by the event device, the noise filter threshold for the first channel and the second channel;

determining, by the event device, a noise filter threshold for at least the first channel and the second channel based on whether the noise is detected in the first channel and the second channel; and applying, by the event device, the noise filter threshold to filter future noise.

15. The method of claim 14, wherein the method includes causing the transceiver to perform the short scan in response to the event device entering a receive mode to receive packets.

16. The method of claim 14, wherein the method includes:

determining, by the event device, whether the noise from the short scan includes the predetermined packet, wherein the predetermined packet includes a packet preamble;

in response to the noise including the packet preamble, consider the noise as a packet for reception and analysis; and in response to the noise not including the packet preamble, cause the transceiver to perform the long scan.

17. The method of claim 14, wherein the method includes:

considering, by the event device in response to the noise being detected in the first channel, the noise as narrowband noise; and considering, by the event device in response to the noise being detected in the first channel and the second channel, the noise as broadband noise.

18. The method of claim 14, wherein the method includes:

considering, by the event device in response to the noise being observed continuously, the noise as continuous noise;

considering, by the event device in response to the noise not being observed continuously, the noise as discrete;

determining, by the event device in response to the noise being considered as discrete, a duty cycle of the noise; and applying, by the event device, the noise filter threshold to at least one of the first channel and the second channel.

* * * * *